United States Patent
Chen et al.

(10) Patent No.: US 8,860,779 B2
(45) Date of Patent: Oct. 14, 2014

(54) TWO-WAY AUDIO AND VIDEO COMMUNICATION UTILIZING SEGMENT-BASED ADAPTIVE STREAMING TECHNIQUES

(75) Inventors: Xuemin Chen, Santa Fe, CA (US); Gordon Yong Li, San Diego, CA (US); Arlen J Kirchoff, Jr., Suwanee, GA (US)

(73) Assignee: Broadcom Corporation, Irvine, CA (US)

( * ) Notice: Subject to any disclaimer, the term of this patent is extended or adjusted under 35 U.S.C. 154(b) by 633 days.

(21) Appl. No.: 13/171,097

(22) Filed: Jun. 28, 2011

(65) Prior Publication Data

US 2012/0300015 A1    Nov. 29, 2012

Related U.S. Application Data

(60) Provisional application No. 61/489,152, filed on May 23, 2011.

(51) Int. Cl.
| | |
|---|---|
| *H04N 7/14* | (2006.01) |
| *H04N 21/845* | (2011.01) |
| *H04N 21/4363* | (2011.01) |
| *H04L 12/18* | (2006.01) |
| *H04N 21/643* | (2011.01) |
| *H04N 21/436* | (2011.01) |
| *H04N 7/15* | (2006.01) |

(52) U.S. Cl.
CPC ........... *H04N 7/152* (2013.01); *H04N 21/8456* (2013.01); *H04N 21/4363* (2013.01); *H04L 12/1827* (2013.01); *H04N 21/64322* (2013.01); *H04N 21/43615* (2013.01)

USPC ........................................ 348/14.12; 348/14.08

(58) Field of Classification Search
CPC ......... H04N 7/14; H04N 7/141; H04N 7/147; H04N 7/15
USPC ...................... 348/14.01, 14.08, 14.09, 14.12
See application file for complete search history.

(56) References Cited

U.S. PATENT DOCUMENTS

| | | | |
|---|---|---|---|
| 8,405,702 B1 * | 3/2013 | Gottlieb ..................... | 348/14.08 |
| 2006/0055771 A1 * | 3/2006 | Kies .......................... | 348/14.03 |
| 2008/0211901 A1 * | 9/2008 | Civanlar et al. ............ | 348/14.09 |
| 2009/0231415 A1 * | 9/2009 | Moore et al. ............... | 348/14.09 |
| 2009/0251529 A1 * | 10/2009 | Tucker et al. .............. | 348/14.09 |
| 2013/0038675 A1 * | 2/2013 | Malik ......................... | 348/14.08 |

* cited by examiner

*Primary Examiner* — Quoc D Tran
(74) *Attorney, Agent, or Firm* — Foley & Lardner LLP

(57) ABSTRACT

A participation device in a multiparty conference call may act as a server device and/or a client device for two-way audio and video (AV) streaming. A server device may encode a requested AV stream into a set of different encoding profiles that may be dynamically determined based on the varying channel conditions and device capacities of the client devices. At least a portion of differently encoded AV streams is selected and dynamically communicated to the client devices for display. Session parameters are determined according to the varying channel conditions and the device capacities of the client devices to create intended sessions. The selected encoded AV streams are communicated utilizing segment-based adaptive streaming techniques such as HTTP. A client device may access to a HTTP session to download an expected AV stream from the server device. The downloaded AV stream may be decoded into different decoding profiles for display as needed.

21 Claims, 6 Drawing Sheets

TWO-WAY AUDIO AND VIDEO COMMUNICATION UTILIZING SEGMENT-BASED ADAPTIVE STREAMING TECHNIQUES

CLAIM OF PRIORITY

This patent application makes reference to, claims priority to and claims benefit from U.S. Provisional Application Ser. No. 61/489,152 which was filed on May 23, 2011.

The above stated application is hereby incorporated herein by reference in its entirety.

CROSS-REFERENCE TO RELATED APPLICATIONS/INCORPORATION BY REFERENCE

This application also makes reference to:
U.S. application Ser. No. 13/171,123 filed on Jun. 28, 2011;
U.S. application Ser. No. 13/170,503 filed on Jun. 28, 2011; and
U.S. application Ser. No. 13/170,653 filed on Jun. 28, 2011.

Each of the above stated applications is hereby incorporated herein by reference in its entirety

FIELD OF THE INVENTION

Certain embodiments of the invention relate to audio and video streaming. More specifically, certain embodiments of the invention relate to a method and system for two-way audio and video communication utilizing segment-based adaptive streaming techniques.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more televisions that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcast, service providers may require use of dedicated set-top boxes (STBs) that may be used to decrypt broadcast signals or provide conditional access to information communicated from the service providers to generate suitable video and/or audio streams that may be played via televisions and/or other display/playback devices in the household.

Services such as Cable TV and IPTV, which are offered by a service provider may run over managed networks for distribution since these services use multicast transport and require certain QoS features. In contrast, conventional streaming technologies such as Microsoft's Windows Media and Adobe's Flash may run over mostly unmanaged, this is, best-effort, networks. These streaming technologies may send the content to the viewer over a unicast connection through either a proprietary streaming protocol running on top of an existing transport protocol, mostly TCP and occasionally UDP, or the standard HTTP protocol that is over TCP.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for two-way audio and video communication utilizing segment-based adaptive streaming techniques, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for two-way audio and video communication utilizing segment-based adaptive streaming techniques. In various embodiments of the invention, a participation device in a multiparty conference call may act as a server device and/or a client device for two-way audio and video (AV) streaming. A server device may encode a requested AV stream into a set of different encoding profiles, comprising various encoding related information such as audio and video resolutions, Codec types, and/or lengths of audio and video segments. The encoding profiles may be determined based on varying channel conditions and device capacities of the client devices. At least a portion of differently encoded AV streams of the requested AV stream may be selected for transmission based on the varying channel conditions and the device capacities of the client devices. The server device may dynamically organize the selected portion of differently encoded AV streams into a series of encoded AV segments of equal or variable lengths based on the varying channel condition and available channel bandwidth. The resulting AV segments may be communicated to the client devices utilizing Hypertext Transfer Protocol (HTTP) for display. Session parameters for two-way AV streaming may be determined according to the varying channel conditions and capacities of the client devices so as to create the sessions prior to the communication of the AV segments. A segment control file may be communicated to the client devices during the creation of the sessions. A client device client device may access, utilizing HTTP, to an intended session created by the server device. The client device may download the expected AV stream from the server device utilizing HTTP for display. The downloaded AV stream may be buffered for AV streaming, and/or may be decoded into different decoding profiles for display via the client device when needed.

Figure 1:
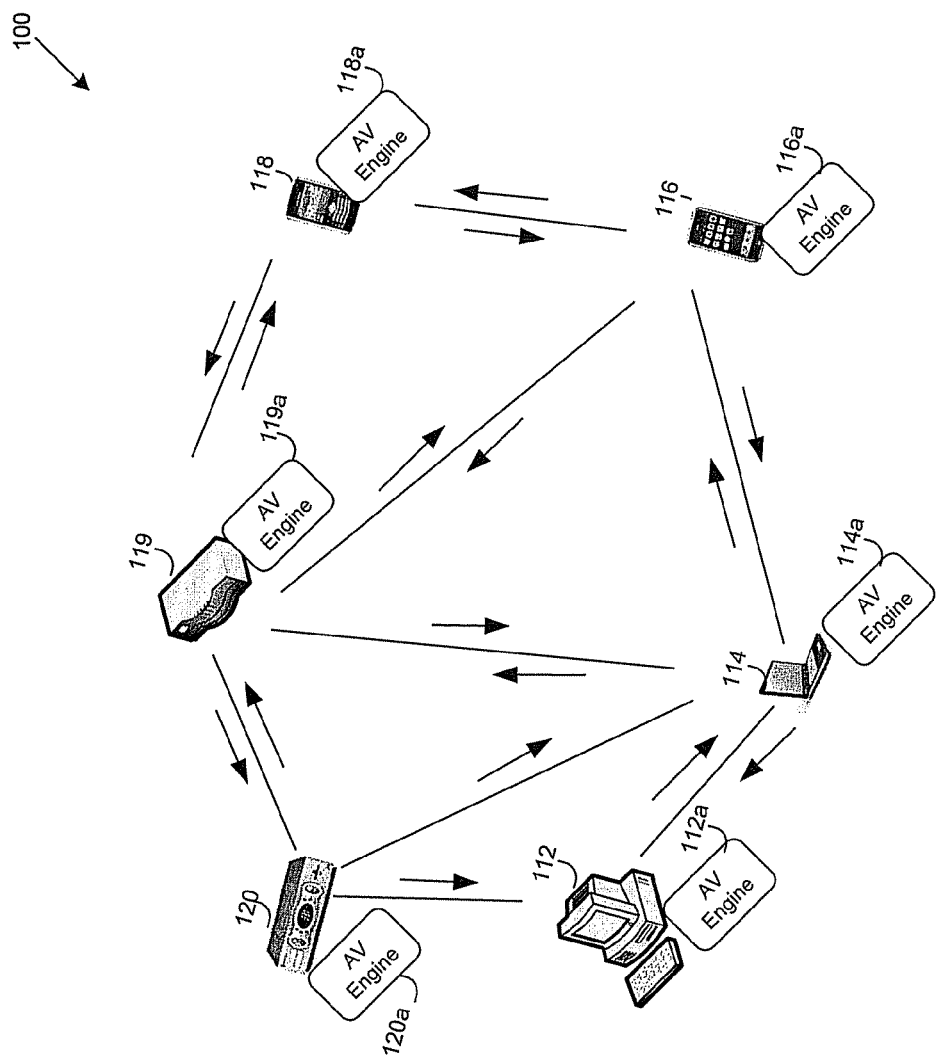
FIG. 1 is a block diagram illustrating an exemplary communication system that supports two-way audio and video communication utilizing segment-based adaptive streaming techniques in a multi-party conference call, in accordance with an embodiment of the invention.

FIG. 1 is a block diagram illustrating an exemplary communication system that supports two-way audio and video communication utilizing segment-based adaptive streaming techniques in a multi-party conference call, in accordance with an embodiment of the invention. Referring to FIG. 1, there is shown a multiparty conferencing communication system 100 comprising a plurality of participant devices, of which participant devices 112-120 are displayed.

The multiparty conferencing communication system 100 may enable the participant devices 112-120 to engage in a real-time audio and video (AV) communication session, with possibly multiple concurrently active users. The participant devices 112-120 may comprise, for example, one or more of a computer, a mobile device, and a digital video recorder (DVR) or personal video recorder (PVR), a set-top box (STB), and various gateways such as a broadband gateway and an Internet Protocol Television (IPTV) gateway. The participant devices 112-120 may comprise suitable logic, circuitry, code, and/or interfaces that may be operable to communicate audio and video (AV) streams with one to another in a multi-party conference call.

A participant device may act or function as a server device and/or a client device. A participant device that may generate and/or provide media resources such as Hypertext Markup Language (HTML) files and AV contents on the fly to one or more other participant devices is referred to a server device. A participant device that may be operable to request and/or receive media resources such as HTML files and AV contents from one or more other participant devices is referred to a client device. For example, in instances where a segment-based adaptive streaming technique such as Hypertext Transfer Protocol (HTTP) is utilized for media communication in a multi-party conference call, a server device may be operable to run an application hosting a web site function, whereas, a client device may comprise a web browser and/or a web crawler function. In an exemplary embodiment of the invention, in a multi-party conference call, a server device may be operable to simultaneously distribute or provide a single source AV stream to one or more client devices, and multiple server devices may concurrently distribute or provide different source AV streams to a single client device. In an exemplary embodiment of the invention, in a multi-party conference call, a participant device may act as a server device and a client device at the same time such that the participant device may distribute or provide a source AV stream to one or more other participant devices while requesting and/or receiving media resources such as HTML files and AV contents from one or more other participant devices.

In operation, the participant devices 112-120 may register to participate in a multi-party conference call. In various exemplary embodiments of the invention, sessions may be established and activated between the participant devices 112-120 when needed. The Session Initiation Protocol (SIP) may be utilized to create, modify and terminate the sessions between the participant devices 112-120. AV streams may be communicated utilizing a segment-based adaptive streaming technique such as HTTP between the participant devices 112-120 during the multi-party conference call. In an embodiment of the invention, changes in channel conditions and/or device capacities may be monitored or sensed. In this regard, the HTTP-based AV streaming between the participant devices 112-120 may be adaptive to the varying channel conditions and changes in device capacities. Depending on the need for the participant devices 112-120 to deliver or receive AV streams in a multi-party conference call, each of the participant devices 112-120 may act or function as a server device and/or a client device dynamically. In this regard, the participant devices 112-120 may be operable to perform two-way audio and video communication utilizing segment-based adaptive streaming techniques such as HTTP over the established sessions whenever needed.

The participant devices 112-120 each may comprise an AV engine for AV related processing. AV engines 112a-120a may be utilized or executed by the participant devices 112-120, respectively, whenever needed. An AV engine such as the AV engine 112a may comprise suitable logic, circuitry, code, and/or interfaces that may be operable to perform multi-rate coding. In this regard, the AV engine 112a may be operable to encode a single AV source stream at multiple bit rates (multiple coding profiles). The AV engine 112a may also be operable to decode a single encoded AV stream at multiple bit rates (multiple coding profiles). A coding profile may comprise coding related information or parameters such as, for example, (audio and video) coding resolution, Codec type, coding rate, segment length or duration, bit rate, frame rate, temporal correlation and/or coding mode. In various exemplary embodiments of the invention, in instances where an AV stream arrives at the participant device 112 for display, the AV engine 112a may be operable to decode the single AV stream at multiple bit rates (multiple coding profiles) based on device display capacities, for example.

In instances where the participant device 112 is coupled to multiple display devices, one of the coding profiles may be selected for each intended display unit for AV display. In instances where the participant device 114 acts as a server device and is expected to send a requested AV stream to one or more client devices such as the participant devices 112 and 116, the participant device 114 (server device) may utilize the AV engine 114a to encode the single requested AV stream at multiple bit rates, which may correspond to multiple coding profiles, based on channel conditions, available bandwidth and/or device capacities of the participant devices 112 and 116 (client devices). The participant device 114 (server device) may select one of the differently encoded AV streams for each of the participant devices 112 and 116 (client devices) based on the varying channel conditions and corresponding device capacities of the participant devices 112 and 116 (client devices). The participant device 114 (server device) may further segment or divide each of the selected encoded AV streams into a series of AV segments for transmission. In this regard, the participant device 114 (server device) may dynamically determine or select the sizes of the AV segments according to the varying channel conditions and available bandwidth. The AV segments may be of equal-length or may comprise a variable-length. The participant device 114 (server device) may communicate or deliver the series of AV segments utilizing segment-based adaptive streaming techniques such as HTTP to the participant devices 112 and 116 (client devices) for display.

Figure 2:
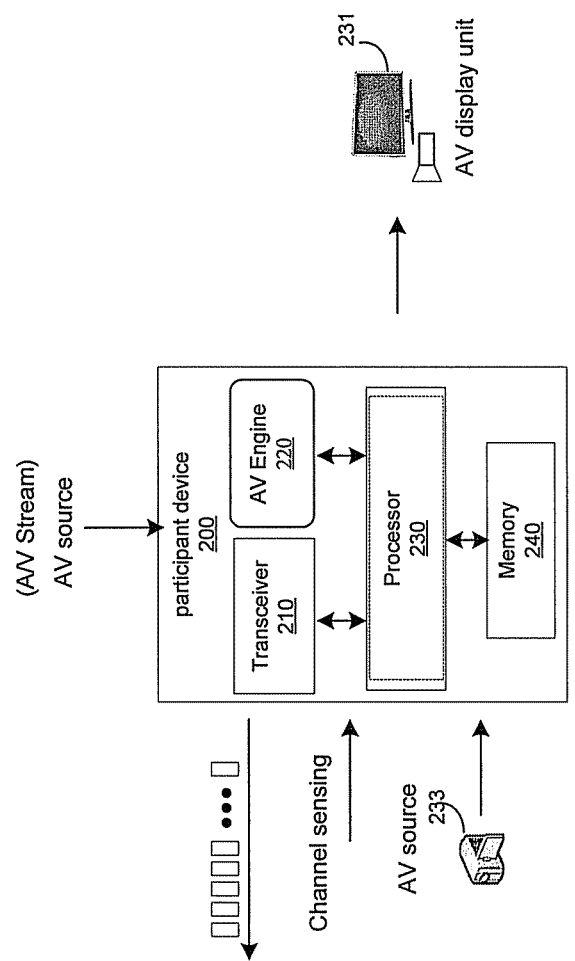
FIG. 2 is a block diagram illustrating a participant device that performs HTTP-based adaptive audio and video streaming in a multi-party conference call, in accordance with an embodiment of the invention.

FIG. 2 is a block diagram illustrating a participant device that performs HTTP-based adaptive audio and video streaming in a multi-party conference call, in accordance with an embodiment of the invention. Referring to FIG. 2, there is shown a participant device 200 comprising a transceiver 210, an AV engine 220, a processor 230 and a memory 240.

The transceiver 210 may comprise suitable logic, circuitry, interfaces and/or code that may be operable to communicate signals such as AV streams with other one or more participant devices in a multi-party conference call over wireless and/or wired communication networks such as, for example, cellular networks, wireless local area network/wide area network, and/or satellite networks. The transceiver 210 may also be operable to communicate AV streams with other one or more participant devices in a multi-party conference call over Internet, Ethernet, digital subscriber line (DSL) networks, multimedia over coax alliance (MoCA) and/or passive optical network (PON).

The AV engine 220 may comprise suitable logic, circuitry and/or code that may be operable to perform audio and video processing for two-way AV streaming. The AV engine 220 may be operable to encode or compress an AV source stream from the AV source 233, for example, at multiple coding profiles. In this regard, the AV engine 220 may determine a set of different AV resolutions based on device capacities of intended client devices. The AV engine 220 may rescale the AV source stream into the determined set of different AV resolutions. For example, the AV source stream may comprise a video stream with a resolution of 1080p and an audio stream with a resolution of 96 kHz and 24-bit. Based on device capacities of intended client devices, the AV encoders 222 may rescale the AV source stream with 1080p for video and 96 kHz and 24-bit for audio into different sets of corresponding AV resolutions such as, for example, with 96 kHz and 16-bit, 192 kHz and 24-bit, 96 kHz and 32-bit, and 192 kHz and 32-bit for audio, and 720p, 1080i, and 1080p for video. The resulting set of rescaled AV streams may be concurrently encoded into a set of encoded AV streams for transmission. In this regard, one of the set of encoded AV streams may be selected for each of the intended client devices. The selected encoded AV streams may be segmented or divided into AV segments of equal or variable lengths to be transmitted to the corresponding client devices. The AV engine 220 may dynamically switch between different Codecs based on the varying channel conditions and corresponding device capacities of the client devices. The Codecs may comprise, for example, H.261, H.263, H.264, MPEG-2, MPEG-4, AVC, VC1 and VP6 for video, and WAV, MP3, MP2, WMA, OGG, G721, G723, G726, and G729 for audio.

The AV engine 220 may be operable to decode or decompress an encoded AV stream from the Internet, for example. In instances where the user of the participant device 200 wants to view the encoded AV stream, the AV engine 220 may determine a coding profile based on its own device capacities. The AV engine 220 may utilize the determined coding profile to decode the encoded AV stream for display via the AV display device 231.

The processor 230 may comprise suitable logic, circuitry, interfaces and/or code that may be operable to manipulate and control operations of associated units such as, for example, the AV engine 220, and the memory 240 to support AV streaming in a multi-party conference call.

The memory 240 may comprise suitable logic, circuitry, interfaces, and/or code that may be operable to store information such as executable instructions and data that may be utilized by the AV engine 220. The executable instructions may comprise various audio and video processing functions that may be utilized to process audio and video contents by the AV engine 220. The executable instructions may comprise AV segment selection algorithms that may be utilized by the AV engine 220 to support HTTP-based adaptive AV streaming. The data may comprise received AV stream data, encoded and decoded audio content, and encoded and decoded video contents. The memory 240 may comprise RAM, ROM, low latency nonvolatile memory such as flash memory and/or other suitable electronic data storage.

In operation, the participant device 200 may register to participate in a multiparty conference call. To view or display an encoded AV stream from the Internet, for example, the AV engine 220 may select a coding profile based on the device capacities to decode the encoded AV stream for display via the AV display unit 231. The encoded AV stream may also be stored into the memory 240 for AV streaming upon request. In instances where an input AV stream is received from the AV source 233 for the AV streaming, the AV engine 220 may encode the input AV stream at a set of different coding profiles into a set of encoded input AV streams. The set of different coding profiles may be determined based on the varying channel conditions and device capacities of intended client devices such as the participant devices 114-120. One of the set of encoded input AV streams may be selected for each intended client device. The selected encoded input AV stream for a client device such as the participant device 114 may be segmented or divided into a series of encoded input AV segments of equal or variable lengths. The AV engine 220 may synchronize and multiplex the series of encoded input AV segments for transmission to the participant device 114 utilizing segment-based adaptive streaming techniques such as HTTP.

Figure 3:
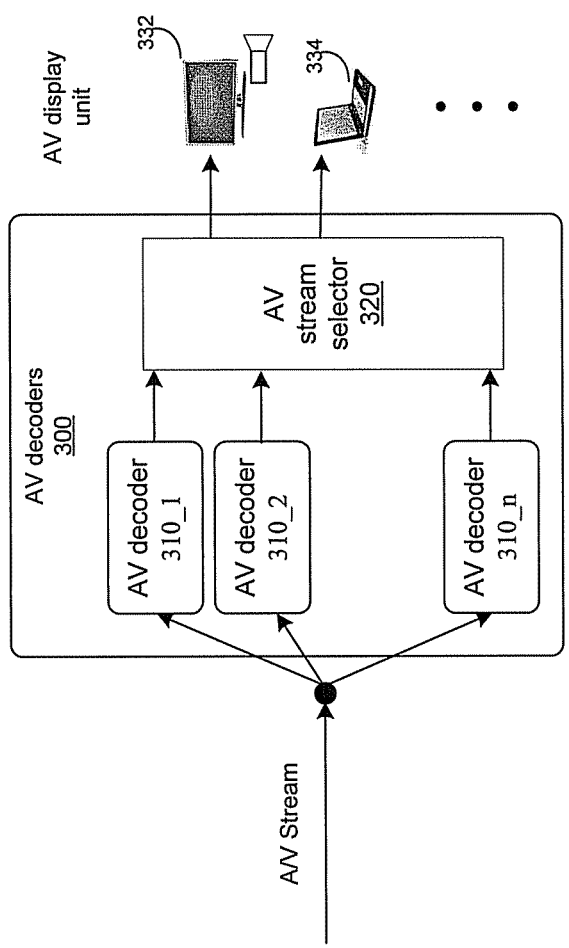
FIG. 3 is a block diagram illustrating an exemplary implementation of audio and video decoding at a participant device in a multi-party conference call, in accordance with an embodiment of the invention.

FIG. 3 is a block diagram illustrating an exemplary implementation of audio and video decoding at a participant device in a multi-party conference call, in accordance with an embodiment of the invention. Referring to FIG. 3, there is shown AV decoders 300 in the AV engine 220 as described in FIG. 2. The AV decoders 300 may comprise AV decoders 310_1 through 310_n, and an AV stream selector 320.

The AV decoders 300 may comprise suitable logic, circuitry and/or code that may be operable to decode or decompress an input AV stream received. In an exemplary operation, the AV decoders 300 may be coupled to a plurality of AV display units 332-334. The AV decoders 300 may be configured to decode the input AV stream at a set of different coding profiles. The coding profiles may be determined based on, for example, the device capacities such as the display resolutions supported by the AV display units 332-334. In instances where the user of the participant device 200 wants to view the input AV stream over the display units 332 and 334, the AV stream selector 320 may select a particular decoded AV stream for each of the display units 332 and 334 for display.

Figure 4:
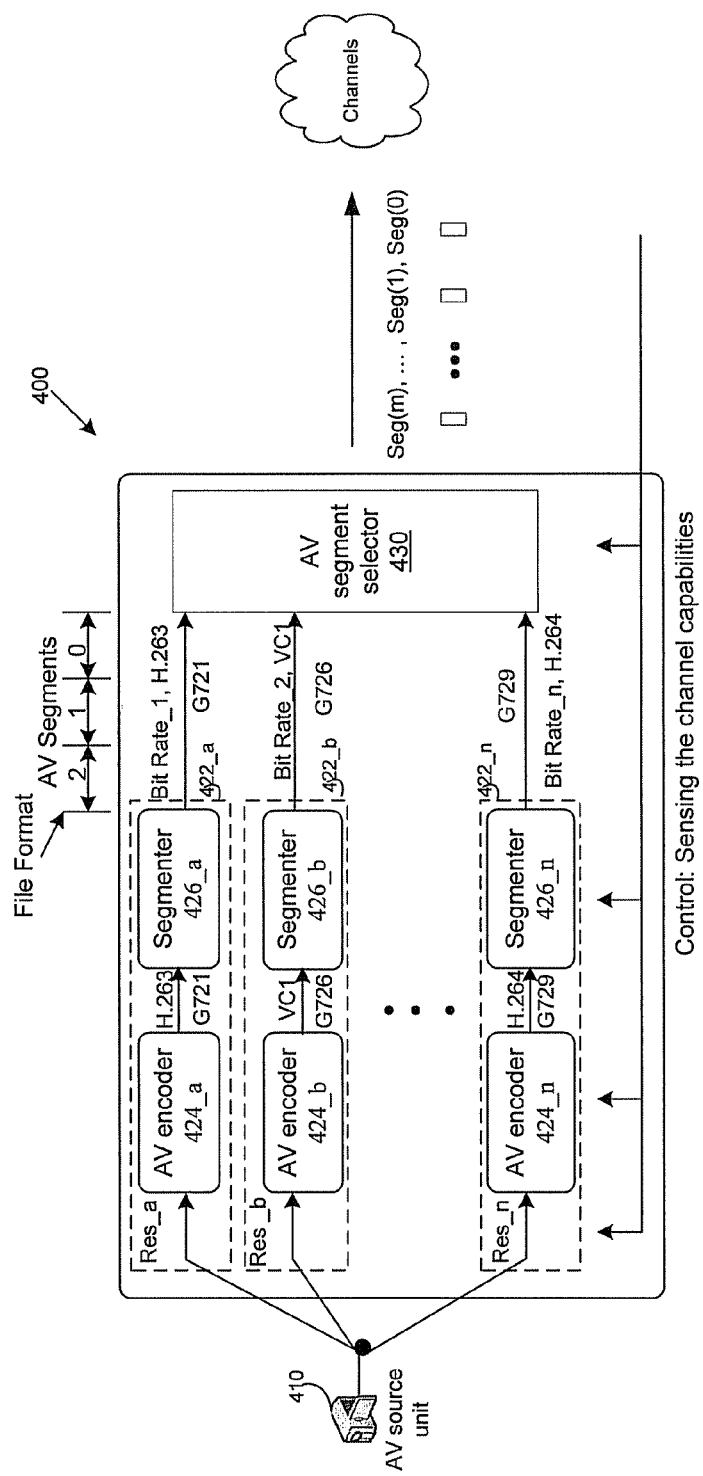
FIG. 4 is a block diagram illustrating an exemplary implementation of audio and video encoding at a participant device in a multi-party conference call, in accordance with an embodiment of the invention.

FIG. 4 is a block diagram illustrating an exemplary implementation of audio and video encoding at a participant device in a multi-party conference call, in accordance with an embodiment of the invention. Referring to FIG. 4, there is shown AV encoders 400 in the AV engine 220 as described in FIG. 2. The AV encoders 400 comprise an AV source unit 410, a plurality of AV encoding branches 422a through 422_n and an AV segment selector 430.

The AV encoding branches 422_a through 422_n may comprise suitable logic, circuitry, interfaces and/or code that may be operable to perform AV processing on a single AV source stream captured by the AV source unit 410. In this regard, the single AV source stream from the AV source unit 410 may be rescaled into a set of different resolutions (Res_a, Res_b, Res_n). The corresponding rescaled AV streams each may be AV processed via a distinct one of the AV encoding branches 422__a through 422__n. Each of the AV encoding branches 422__a through 422__n comprises an AV encoder and a segmenter for corresponding AV processing. For example, the rescaled AV stream with resolution of Res_a may be processed by the AV encoding branch 422__a. The AV encoding branch 422__a may comprise an AV encoder 424__a and a segmenter 426__a.

The AV encoder 424__a may comprise suitable logic, circuitry, interfaces and/or code that may be operable to encode the rescaled AV stream with the resolution of Res_a utilizing an AV Codec such as MPEG-2, MPEG-4, AVC, VC1 and VP6 for video, and WAV, MP3, MP2, WMA, OGG, G721, G723, G726, and G729 for audio. In this regard, the AV encoder 424__a may dynamically switch between various Codecs based on varying channel conditions and available bandwidth. The AV encoder 424__a may provide an encoded AV stream to the segmnter 426__a.

The segmenter 426a may comprise suitable logic, circuitry, interfaces and/or code that may be operable to segment or divide the encoded AV stream from the AV encoder 424__a into a series of AV segments. In this regard, the segmnter 426__a may dynamically segment or organize the encoded AV stream into a series of segments of equal or variable lengths depending on varying channel conditions and available bandwidth. The segmenter 426a may append corresponding segment related information to a segment configuration file stored in the AV encoders 400. The stored segment configuration file may be transmitted to an intended client device during the session setup phase. For example, a URL for the segment configuration file may be communicated utilizing the session control protocol such as SIP to the intended client device, which in turn may retrieve the segment configuration file via a file retrieval protocol such as HTTP or TFTP. The appended segment related information contained in the segment configuration file may comprise descriptive information, for example, the location and the duration of the corresponding AV segments, which enables the intended client device to choose or extract AV segments from received HTTP responses.

The AV segment selector 430 may comprise suitable logic, circuitry, interfaces and/or code that may be operable to dynamically identify or select AV segments from the segmenters 426__a through 426__n. The AV segment selector 430 may be operable to dynamically select AV segments for each of the intended client devices in multiparty conferencing based on the varying channel conditions and device capacities of the corresponding intended client devices.

In an exemplary operation, the AV encoders 400 in the AV engine 220 may be configured to process an AV source stream captured by the AV source unit 410 during AV streaming to one or more client devices such as the participation devices 112-120, for example. Based on device capacities of the participation devices 112-120 (client devices), the captured AV source stream may be rescaled into a set of different resolutions (Res_a, Res_b, Res_n). Each of the rescaled AV streams with resolutions (Res_a, Res_b, Res_n) may be processed via the AV encoding branches 422a through 422__n, respectively. For example, the AV encoding branch 422__a may encode the rescaled AV stream with resolution of Res_a via the AV encoder 424__a. The resulting encoded AV stream may be segmented by the segmenter 426__a. The AV segments may be output to the AV segment selector 430. The AV encoders 400 may receive the information from the client devices about changes in channel conditions and in device capacities of the client devices. For example, the AV encoders 400 may receive such information from the client devices via the session control protocol such as SIP during an active session. The AV encoders 424__a through 424__n may dynamically switch between various Codecs based on the varying channel conditions and corresponding device capacities of the intended client devices. The size of the AV segments may be adaptively adjusted via the segmenters 426__a through 426__n according to the varying channel conditions, available bandwidth and/or AV processing delay.

Figure 5:
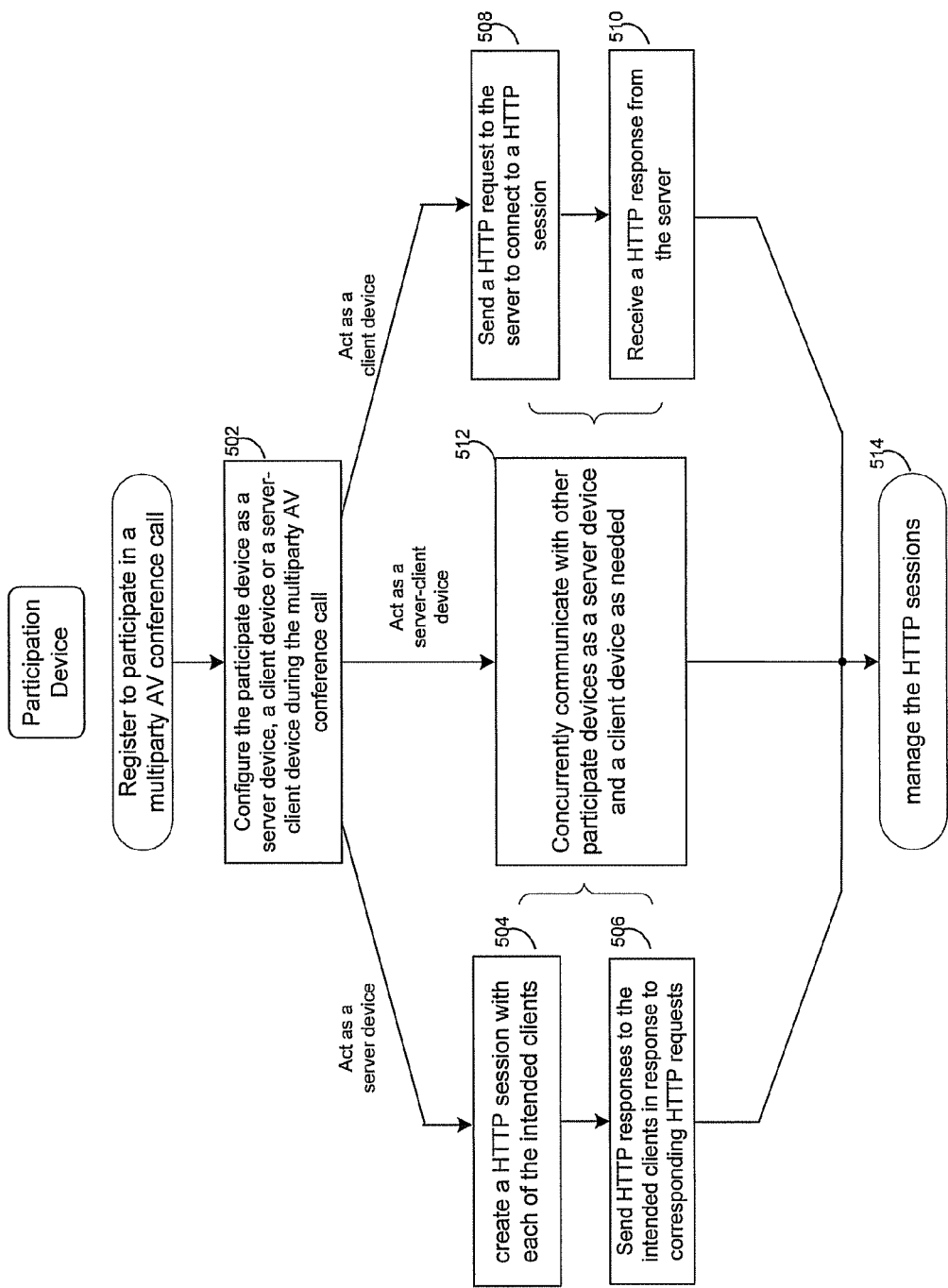
FIG. 5 is a flow chart that illustrates exemplary steps that may be performed by a participation device in a multi-party conference call for two-way HTTP-based audio and video streaming, in accordance with an embodiment of the invention.

FIG. 5 is a flow chart that illustrates exemplary steps that may be performed by a participation device in a multi-party conference call for two-way HTTP-based audio and video streaming, in accordance with an embodiment of the invention. Referring to FIG. 5, a device registers to participate in a multiparty conference call. The exemplary steps may start with step 502, where the participation device such as the participation device 114 may be dynamically configured to act as a server device, a client device or a server and client device in an as needed basis during the multiparty conference call. In instances where the participation device 114 is configured as a server device and needs to provide AV content to one or more other participation devices, the exemplary steps may proceed in step 504. In step 504, the participation device 114 (server device) may be operable to create a session such as a HTTP session between the participation device 114 and each of the one or more participation devices (client devices). In step 506, the participation device 114 (server device) may send HTTP responses to the one or more participation devices (client devices) in response to corresponding HTTP requests. The exemplary steps may proceed in step 514, where the server device may manage such as modify and/or terminate the HTTP sessions when needed.

In step 502, in instances where the participation device 114 is configured as a client device and expects to receive AV content or AV resources such as HTML files and images from one or more other participation devices, then in step 508, where the participation device 114 (client device) may be operable to send a request utilizing segment-based adaptive streaming techniques such as HTTP to an associated server device so as to connect to a HTTP session between the server device and the participation device 114 (client device). In step 510, the participation device 114 (client device) may receive HTTP responses from the server device. The received HTTP response may comprise AV content requested by the participation device 114 (client device). The exemplary steps may proceed in step 514.

In step 502, in instances where the participation device 114 is configured as a server device and a client device at the same time, then in step 512, where the participation device 114 (a server-client device) may be operable to concurrently communicate with other participate devices as a server device and/or a client device as needed. For example, the participation device 114 (a server-client device) may concurrently perform steps 504-506 as a server device and steps 508-510 as a client device during the multiparty AV conference call when needed. The exemplary steps may proceed in step 514.

Figure 6:
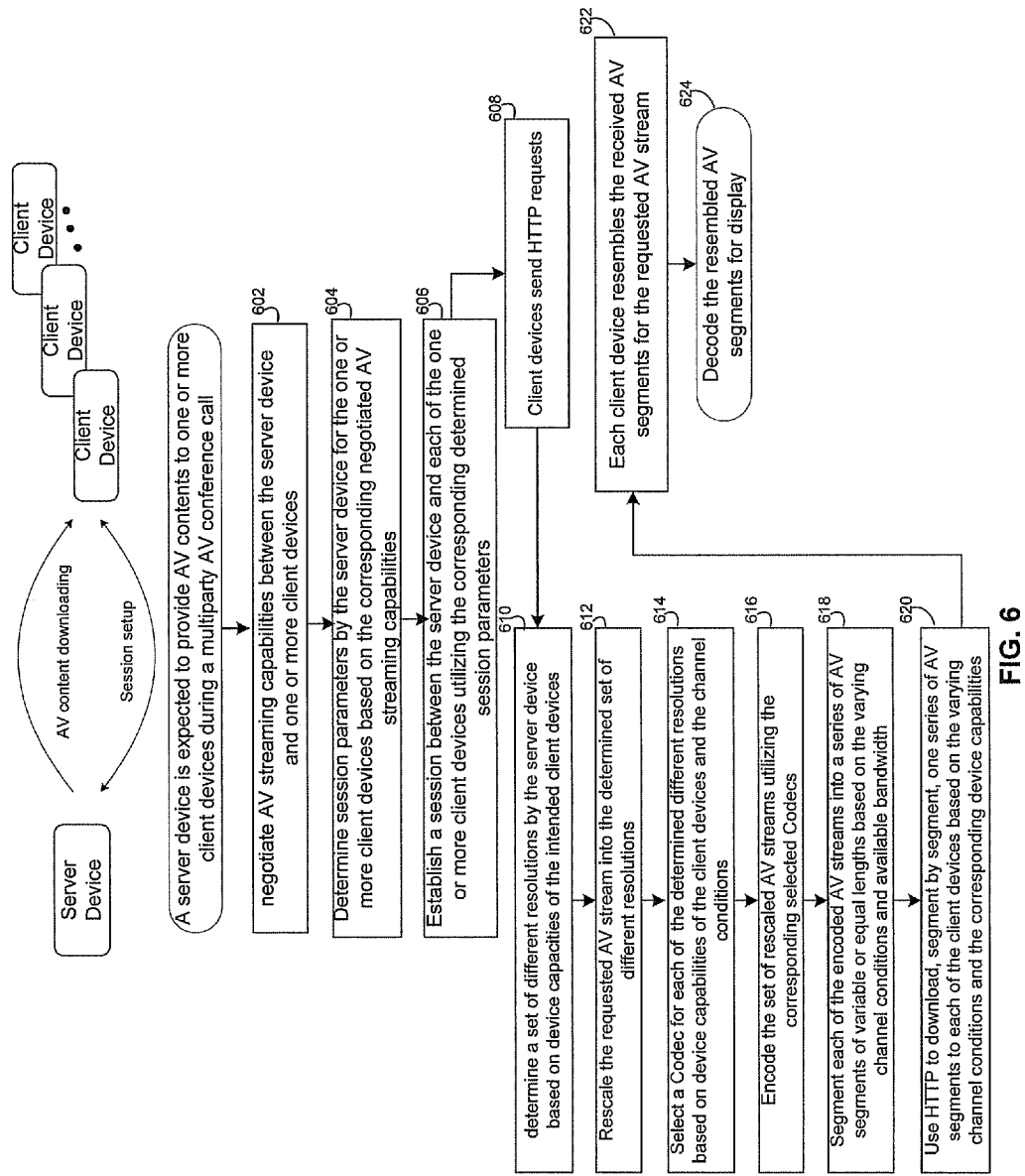
FIG. 6 is a flow chart that illustrates exemplary steps that may be performed to set up a session for audio and video communication utilizing segment-based adaptive streaming techniques in a multi-party conference call, in accordance with an embodiment of the invention.

FIG. 6 is a flow chart that illustrates exemplary steps that may be performed to set up a session for audio and video communication utilizing segment-based adaptive streaming techniques in a multi-party conference call, in accordance with an embodiment of the invention. Referring to FIG. 6, the participation device 114, acting as a server device, may need to create a session with each intended client device during a multiparty AV conferencing call. The exemplary steps may start with step 602, where the participation device 114 (server device) may negotiate AV streaming capacities with the client devices such as the participation devices 112, 116 and 119. In step 604, the participation device 114 (server device) may determine session parameters for each one of the participation devices 112, 116 and 119 (client devices) based on the corresponding device capacities. In step 606, the participation device 114 (server device) may establish or create a session with each of the participation devices 112, 116 and 119 (client devices), respectively, based on the corresponding negotiated AV streaming capabilities. The established sessions may be activated to perform AV streaming from the participation device 114 (server device) to the corresponding participation devices 112, 116 and 119 (client devices) via HTTP.

In step 608, the participation devices 112, 116 and 119 (client devices) may send HTTP requests, for example, to the participation device 114 (server device) for progressive downloading of an AV stream available at the participation device 114 (server device).

In step 610, the participation device 114 (server device) may determine a set of different resolutions based on device capacities of the participation devices 112, 116 and 119 (client devices). In step 612, the participation device 114 (server device) may rescale the requested AV stream into the determined set of different resolutions. In step 614, the participation device 114 (server device) may select a Codec for each of the determined different resolutions based on device capacities of the participation devices 112, 116 and 119 (client devices), and the varying channel conditions. In step 616, the participation device 114 (server device) may encode the set of rescaled AV streams utilizing the corresponding selected Codecs. In step 618, the participation device 114 (server device) may segment each of the encoded AV streams into a series of AV segments of variable or equal lengths based on the varying channel conditions and available bandwidth. In step 620, the participation device 114 (server device) may utilize HTTP or HTTPS to download, segment by segment, one series of AV segments to each of the participation devices 112, 116 and 119 (client devices) based on the varying channel conditions and the corresponding device capacities of the client devices. In step 622, each of the participation devices 112, 116 and 119 (client devices) may resemble the corresponding received AV segments for the requested AV stream from the participation device 114 (server device). In step 624, the participation devices 112, 116 and 119 (client devices) may each decode the corresponding resembled AV segments for display.

Various embodiments of the invention may comprise a method and system for two-way audio and video communication utilizing segment-based adaptive streaming techniques. In an exemplary embodiment of the invention, a plurality of devices may register to participate in a multiparty conference call in a multiparty conferencing communication system 100. In various embodiments of the invention, the participation device 200 may act as a server device and/or a client device to support two-way AV streaming in the multiparty conference call.

In instances where the participant device 200 acts as a server device and is expected to send a AV stream requested by one or more other participation devices 112-120 (client devices) in the multiparty conference call, the participant device 200 (server device) may encode the single requested AV stream via the AV engine 114*a* utilizing a set of different encoding profiles. The set of different encoding profiles may comprise various encoding related information such as audio and video resolutions, Codec types, and/or lengths of audio and video segments. The set of different encoding profiles may be determined based on the varying channel conditions and device capacities of the one or more other participation devices 112-120 (client devices). At least a portion of differently encoded AV streams of the requested AV stream may be selected for transmission based on the varying channel conditions and the device capacities of the one or more other participation devices 112-120 (client devices).

The participation device 200 (server device) may dynamically organize or segment the selected at least a portion of differently encoded AV streams into a series of encoded AV segments of equal or variable lengths based on the varying channel condition and available channel bandwidth. The resulting segmented AV segments may be communicated to the one or more other participation devices (client devices) for display. In various embodiments of the invention, the participation device 200 (server device) may be operable to determine session parameters such as session durations to set up sessions between the participation device 200 (server device) and each of the one or more other participation devices 112-120 (client devices) according to the varying channel conditions and the device capacities of the one or more other participation devices 112-120 (client devices). The participation device 200 (server device) may create the sessions utilizing the determined session parameters prior to the communication of the AV segments. Segment-based adaptive streaming techniques such as Hypertext Transfer Protocol (HTTP) may be adopted or utilized by the participation device 200 (server device) to communicate the AV segments to the one or more other participation devices 112-120 (client devices) during the created sessions. In an embodiment of the invention, the participation device 200 (server device) may communicate to the one or more other participation devices 112-120 (client devices) a segment control file that contains information about the series of encoded audio and video segments during the creation of the sessions.

In instances where the participant device 200 acts as a client device and expects to receive or download an AV stream from one participation device (server device) such as the participant device 114 in the multiparty conference call, the participant device 200 (client device) may be operable to connect or access to an intended session utilizing HTTP. The intended HTTP session may be created by the participation device 114 (server device). The participant device 200 may be operable to download the expected AV stream from the participation device 114 (server device) utilizing segment-based adaptive streaming techniques such as HTTP. In instances where the downloaded AV stream is expected to be forwarded or replayed to other participation devices, the participant device 200 may first buffer the downloaded AV stream and forward the buffered AV stream to other participations devices 112-120 when needed. In instances where the user of the participation device 200 wants to view the downloaded AV stream via the AV display units 332-334, the participant device 200 may be operable to decode the downloaded AV stream via the AV engine 222. In this regard, the participant device 200 may decode the downloaded AV stream into a set of different decoding profiles. The set of different decoding profiles may be determined based on device capacities of the participant device 200. One or more decoded audio and video streams of the downloaded audio and video stream may be selected based on the device capacities of the participant device 200 to be displayed over the AV display units 332-334.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for two-way audio and video communication utilizing segment-based adaptive streaming techniques.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking in a device configured to participate in a multiparty audio and video conference call, the method comprising:
   encoding an audio and video stream utilizing a set of different encoding profiles to generate an encoded audio and video stream, the set of different encoding profiles determined based on at least one of channel conditions or device capacities of one or more other devices in the multiparty audio and video conference call;
   organizing the encoded audio and video stream into a series of encoded audio and video segments, a size of one or more of the series of encoded audio and video segments determined based on at least one of the channel conditions or an available bandwidth; and
   communicating at least a portion of the series of encoded audio and video segments to said one or more other devices in the multiparty audio and video conference call.

2. The method of claim 1, wherein the different encoding profiles comprise at least one of audio and video resolutions, Codec types, or lengths of audio and video segments.

3. The method of claim 2, further comprising:
   determining session parameters for one or more sessions between the device and each of the one or more other devices based on the channel conditions and the device capacities of the one or more other devices; and
   creating by the device, the one or more sessions utilizing the session parameters prior to the communication.

4. The method of claim 3, further comprising communicating, during the sessions, the portion of the series of encoded audio and video segments to the one or more other devices utilizing a Hypertext Transfer Protocol (HTTP).

5. The method of claim 4, further comprising communicating to the one or more other devices during creating said sessions a segment control file that contains information about the series of encoded audio and video segments.

6. The method according to claim 4, the one or more sessions comprising one or more first sessions and the audio and video stream comprising a first audio and video stream, the method further comprising:
   accessing a second session utilizing the HTTP, wherein the second session is created by a first other device of the one or more other devices in the multiparty audio and video conference call; and
   downloading, in the accessed session, a second audio and video stream from the first other device utilizing the HTTP.

7. The method according to claim 6, further comprising communicating the second audio and video stream to at least one second other device of the one or more other devices utilizing the HTTP.

8. The method according to claim 6, further comprising decoding the second audio and video stream utilizing a set of different decoding profiles, the set of different decoding profiles determined based on the channel conditions and the device capacities of the device.

9. The method according to claim 8, the second audio and video stream comprising a plurality of second audio and video streams, each associated with one of the different decoding profiles, decoding the second audio and video stream comprising generating one or more decoded second audio and video streams, and the method further comprising selecting one or more of the decoded second audio and video streams of the second audio and video stream based on the channel conditions and the device capacities of the device.

10. A system comprising:
    one or more circuits for use in a device configured to participate in a multiparty audio and video conference call, the one or more circuits configured to:
       encode an audio and video stream utilizing a set of different encoding profiles to generate an encoded audio and video stream, the set of different encoding profiles determined based on at least one of channel conditions or device capacities of one or more other devices in the multiparty audio and video conference call;
       organize the encoded audio and video stream into a series of encoded audio and video segments, a size of one or more of the series of encoded audio and video segments determined based on at least one of the channel conditions or an available bandwidth; and
       communicate at least a portion of the series of encoded audio and video segments to said one or more other devices in the multiparty audio and video conference call.

11. The system according to claim 10, wherein the different encoding profiles comprise at least one of audio and video resolutions, Codec types, or lengths of audio and video segments.

12. The system according to claim 11, wherein the one or more circuits are configured to:
    determine session parameters for one or more sessions between the device and each of the one or more other devices based on the channel conditions and the device capacities of the one or more other devices; and create the one or more sessions utilizing the session parameters prior to the communication.

13. The system according to claim 12, wherein the one or more circuits are configured to communicate, during the sessions, the portion of the series of encoded audio and video segments to the one or more other devices utilizing a Hypertext Transfer Protocol (HTTP).

14. The system according to claim 13, wherein the one or more circuits are configured to communicate to the one or more other devices during creating said sessions a segment control file that contains information about the series of encoded audio and video segments.

15. The system according to claim 13, wherein the one or more circuits are configured to:

access a second session utilizing the HTTP, wherein the second session is created by a first other device of the one or more other devices in the multiparty audio and video conference call; and download, in the accessed session, a second audio and video stream from the first other device utilizing the HTTP.

16. The system according to claim 15, wherein the one or more circuits are configured to communicate the second audio and video stream to at least one second other device of the one or more other devices utilizing the HTTP.

17. The system according to claim 15, wherein the one or more circuits are configured to decode the second audio and video stream utilizing a set of different decoding profiles, the set of different decoding profiles determined based on the channel conditions and the device capacities of the device.

18. The system according to claim 17, the second audio and video stream comprising a plurality of second audio and video streams, each associated with one of the different decoding profiles, the one or more circuits configured to decode the second audio and video stream to generate one or more decoded second audio and video streams, wherein the one or more circuits are further configured to select one or more of the decoded second audio and video streams of the second audio and video stream based on the channel conditions and the device capacities of the device.

19. The method of claim 1, organizing the encoded audio and video stream into the series of encoded audio and video segments comprising dynamically determining the size of the one or more of the encoded audio and video segments while the multiparty audio and video conference call is in progress based on one or more variations in the at least one of the channel conditions or the available bandwidth.

20. The method of claim 1, encoding the audio and video stream comprising:

determining a plurality of resolutions based on the device capacities of the one or more other devices;

rescaling the audio and video stream to generate a set of rescaled audio and video streams, each of the rescaled audio and video streams associated with a different one of the plurality of resolutions; and selecting a codec for each of the rescaled audio and video streams based on the resolution associated with the rescaled audio and video stream, the device capacities of one or more of the other devices, and the channel conditions.

21. One or more computer-readable storage media having instructions stored thereon that, when executed by one or more processors of a device configured to participate in a multiparty audio and video conference call, cause the one or more processors to perform operations comprising:

encoding an audio and video stream utilizing a set of different encoding profiles to generate an encoded audio and video stream, the set of different encoding profiles determined based on at least one of channel conditions or device capacities of one or more other devices in the multiparty audio and video conference call;

organizing the encoded audio and video stream into a series of encoded audio and video segments based at least in part on at least one of the channel conditions or an available bandwidth; and communicating at least a portion of the series of encoded audio and video segments to said one or more other devices in the multiparty audio and video conference call.

* * * * *